United States Patent
Boussemart et al.

(10) Patent No.: US 8,549,824 B2
(45) Date of Patent: Oct. 8, 2013

(54) CAPSULE TREATMENT APPARATUS

(75) Inventors: Christophe S. Boussemart, Lugrin (FR); Maxime Loretan, Massongex (CH); Alexandre Perentes, Lausanne (CH)

(73) Assignee: Nestec S.A., Vevey (CH)

( * ) Notice: Subject to any disclaimer, the term of this patent is extended or adjusted under 35 U.S.C. 154(b) by 353 days.

(21) Appl. No.: 12/996,760

(22) PCT Filed: Jun. 18, 2009

(86) PCT No.: PCT/EP2009/057560
§ 371 (c)(1),
(2), (4) Date: Feb. 23, 2011

(87) PCT Pub. No.: WO2009/153298
PCT Pub. Date: Dec. 23, 2009

(65) Prior Publication Data
US 2011/0139847 A1    Jun. 16, 2011

(30) Foreign Application Priority Data

Jun. 20, 2008 (EP) .................... 08158653

(51) Int. Cl.
*B65B 43/00* (2006.01)
*B26F 3/00* (2006.01)

(52) U.S. Cl.
USPC ............ 53/492; 53/381.1; 53/381.2; 414/411

(58) Field of Classification Search
USPC .................. 53/492, 381.1, 381.2; 414/411, 414/412; 99/284; 426/112
See application file for complete search history.

(56) References Cited

U.S. PATENT DOCUMENTS

| | | | |
|---|---|---|---|
| 2,818,985 A | 1/1958 | Irmscher | 214/305 |
| 3,386,602 A | 6/1968 | Kanarek | 214/305 |
| 3,682,341 A * | 8/1972 | Happel | 414/412 |
| 3,800,399 A * | 4/1974 | Warrick et al. | 29/403.3 |
| 4,478,118 A * | 10/1984 | Lightner | 83/24 |
| 4,653,973 A * | 3/1987 | Scholz | 414/412 |
| 2007/0113705 A1 | 5/2007 | Szente et al. | 75/401 |

FOREIGN PATENT DOCUMENTS

| | | |
|---|---|---|
| CN | 1302696 A | 7/2001 |
| CN | 2459106 Y | 11/2001 |
| CN | 2817998 Y | 9/2006 |
| EP | 0 512 468 B1 | 11/1992 |
| EP | 0 512 470 B1 | 11/1992 |
| EP | 0 602 203 B1 | 6/1994 |
| EP | 1 430 953 B1 | 6/2004 |
| EP | 2201312 A1 | 3/2011 |

(Continued)

OTHER PUBLICATIONS

International Search Report, PCT/EP2009/057560, mailed Aug. 21, 2009.

*Primary Examiner* — Hemant M Desai
(74) *Attorney, Agent, or Firm* — Winston & Strawn LLP

(57) ABSTRACT

A capsule-treatment machine is arranged for separating a packaging of a capsule, in particular made of metal such as aluminum or plastic, from a capsule food or beverage ingredient contained therein. The machine includes a mechanism for opening the capsule packaging that is fed to the machine and for removing the capsule ingredient from the opened capsule packaging; a parting mechanism for parting the opened capsule packaging from the capsule ingredient; a collector for collecting the opened capsule packaging; and means a collector for collecting the capsule ingredient.

20 Claims, 5 Drawing Sheets

(56) References Cited

FOREIGN PATENT DOCUMENTS

| JP | 2001121009 A | 5/2001 |
| JP | 2006192363 A | 7/2006 |
| WO | WO 2008/139322 A1 | 11/2008 |
| WO | WO2009/153298 A1 | 12/2009 |

* cited by examiner

CAPSULE TREATMENT APPARATUS

This application is a 371 filing of International Patent Application PCT/EP2009/057560 filed Jun. 18, 2009.

FIELD OF THE INVENTION

The present invention relates to an apparatus for the treatment of used capsules containing a used or residual food or beverage ingredient.

BACKGROUND ART

Liquid food and beverage preparation apparatuses, in particular coffee machines, which use prepacked or non-packed portions of a food or beverage substance are very widespread among private individuals, and also in municipalities, shopping centres and companies. The preparation principle is based on the extraction of portions of the substance by the passage through this substance of a quantity of cold or hot liquid, typically water, under high pressure, above atmospheric pressure.

Examples of a prepacked portion, or capsule, are described in patent EP 0 512 468 B1 and in patent EP 0 602 203 B1.

Such capsule extraction systems have many advantages. On the one hand, the individual capsules are easy to use and require no batching of coffee or other substances, in the machine. The user places a capsule, a ground-coffee dose or other portions in the machine, then presses a button to start extraction. On the other hand, the individual packages are batched to deliver a beverage, like a coffee, having the desired characteristics such as sufficient character, flavour, foam or other important attributes. When they are impermeable, they usually preserve the freshness of the substance better, up to the time of extraction. Finally, the preparation conditions, such as the temperature, pressure and extraction time can be better controlled, thereby guaranteeing relatively controlled and constant quality to the consumer.

An example of an extraction method is described in patent EP 0 512 470 B1.

Once the capsule has been used to prepare a liquid food or beverage, a used ingredient such as coffee grounds may remain in the capsule. The combination of the capsule and used food or beverage ingredient contained therein causes problems for the recycling. Indeed the recycling of the capsule material and of the used food or beverage ingredient requires different processes, one for the capsule material and a separate one for the used beverage or food ingredient, typically the plastic or metal packaging on the one hand and the organic ingredient on the other hand. Most communities require separation for collection and recycling of the recyclable waste material, such as for instance glass, plastic, aluminium, organic material, etc. . . .

It is known to separate aluminium from a composite aluminium-polymer material by heating the composite material in a non oxidised environment to volatilize the polymer, as for instance disclosed in US 2007/0113705.

Industrial separation of aluminium capsules from coffee grounds involves a first step of drying the coffee grounds and a second step of sucking the dried coffee grounds out of the capsules. Such separation processes require a complex installation and significant amount of energy.

Plastic capsules, on the other hand, are usually not even recycled but merely incinerated or dumped into landfills which causes pollution.

Some places, e.g. Switzerland, have set up an organised community collection system for such used aluminium capsules, in addition to the usual recycling collection, so that the recycling rate of such capsules is quite high. However, many places do not have a separate dedicated community recycling channel for the capsules that combine plastic or metal with organic food or beverage ingredients, so that such used capsules have to be sent back to the producer for recycling by the consumer or they are simply incinerated or dumped into landfills with the non-recyclable household garbage.

Therefore, especially for those places which have not set up a dedicated community collection and recycling system, there is still a need to provide a simple system for allowing collection and recycling of such used capsules containing used or residual food or beverage ingredients.

SUMMARY OF THE INVENTION

The invention generally relates to a capsule separator for treating capsules in view of recycling.

The term "capsule" means any type of suitable packaging (hereinafter the "capsule packaging") containing portioned food or beverage ingredient (hereinafter the "capsule ingredient") adapted to be inserted in an extraction/brewing chamber of a liquid food or beverage preparation machine. The present invention is particularly suited for capsules having a rigid capsule packaging, in particular a rigid receptacle made of metal such as aluminium capsules and sealed with a thin pierceable or tearable aluminium cover or cap, used for the preparation of coffee, such as espresso. Examples of such capsules are disclosed in the abovementioned EP 0 512 468.

The capsule is in particular suitable for liquid food or beverage preparation machines having a capsule chamber which is arranged for the injection of liquid, in particular water, into the capsule housed in the chamber and for the output of the thus produced beverage or liquid food, which is the result of an interaction (extraction, brewing, dissolution . . . ) of the liquid with the capsule ingredient contained in the capsule packaging.

More particularly, the invention is concerned with the separation of a capsule packaging from a used capsule ingredient contained therein, for use in particular at home, in offices, in restaurants, in common parts of apartment buildings or at local public community garbage collection places, so that the capsule packaging and the used capsule ingredient may be collected separately and treated by the usual community recycling channels.

Therefore, the invention relates to a capsule-treatment machine for separating a packaging of a capsule, in particular made of metal such as aluminium and/or plastic, from a capsule ingredient contained therein. The machine comprises: means for opening the capsule packaging fed to such machine and removing the capsule ingredient from the opened capsule packaging, therefor the opening and removal means being in particular arranged to rotate relatively to the fed capsule and to intercept the capsule and/or vice versa; means for parting the opened capsule from the ingredient; means for collecting the opened capsule packaging substantially freed of capsule ingredient; and means for collecting the capsule ingredient.

Typically, the opening and removal means open mechanically the capsule packaging and remove by a mechanical action the capsule ingredient from the capsule packaging.

The maximum number of capsules that may be treated simultaneously or in a row to separate the capsule packagings from the capsule ingredient(s) will depend on the capacity of the machine, in particular of the opening and removal means and of the collection means. The opening and removal means may comprise an opener cavity that receives the fed capsule for opening thereof. The opener cavity may contain one or more shock members that are movable, in particular rotatably, relative to the fed capsule and that are arranged to break open, smash or tear open the capsule packaging and remove the capsule ingredient therefrom by hitting the capsule packaging. In such a case, violent collisions between the capsule packaging and hard obstacles, for example protruding rods, bars or blades, open the capsule packaging, in particular when present the thin capsule aluminium cover or cap, and separate, e.g. shake, the capsule ingredient out or away from the opened capsule packaging.

Typically, the opening and removal means comprise a rotatable drive means arranged to rotate and drive the shock members and/or the fed capsules.

In one embodiment, the rotatable drive means comprises a rotatable surface, the shock members comprising at least one shock member that is drivable by said surface and/or at least one shock member that is fixed in the opener cavity. For example, the rotatable surface is a generally planar surface from which one or more rotatable shock members extend, the opener cavity comprising one or more fixed shock members, at least one of which is optionally located adjacent to the rotation path of a rotatable shock member. The opener cavity may comprise a series of spaced apart shock members, in particular fixed shock members, at the periphery of the rotatable surface that is arranged to drive the capsule forcefully, e.g. throw the capsule, against the shock members, the rotatable drive means optionally comprising a rotary beater arrangement centrally located on the rotatable surface for hitting and impelling the fed capsule towards the peripheral shock members. The rotatable surface can have a conical portion and face a correspondingly fixed conical surface spaced apart therefrom by a spiral capsule ramp extending therebetween, the capsule being driven up the ramp by rotatable shock members and opened against fixed shock members, the rotatable drive means optionally comprising a rotary beater arrangement centrally located on the rotatable surface for hitting and impelling the fed capsule onto the ramp.

In any case, the drive means may include such a rotary beater to increase the energy transferred to the capsule for its opening and removal of the ingredient contained therein.

The opening and removal means may include sharp or cutting edges, such as blades, for opening the capsule packaging. For instance, the opening and removable means comprise a mincer, shredder or chopper, in particular a mincer, shredder or chopper cooperating with an Archimedean screw for driving the capsule onto the mincer, shredder or chopper. In this embodiment, the capsule packaging is not necessarily opened by shocks but can be opened by a mere shearing action of one or two cutting edges.

The opening and removal means may comprise a rotatable drive shaft, in particular a generally upright drive shaft, from which one or more members, such as shock members and/or cutting members, extend radially, the capsule being feedable for its opening through the rotating radial members.

The parting means typically comprises at least one sieve, in particular a mesh sieve or a sieve made of a foraminate platelike member, for allowing the passage of the capsule ingredient and for preventing the passage of the capsule packaging or parts thereof. The sieve optionally cooperates with at least one of a stirring arrangement, a scraping arrangement and a liquid washing arrangement for promoting the passage of the capsule ingredient through the sieve and/or for moving the capsule ingredient and the capsule packaging and parts thereof along the sieve.

The opening and removal means can be located in an opener cavity which further forms the collection means for collecting the capsule packaging or the capsule ingredient. At least one of the capsule packaging and the capsule ingredient may be evacuated from the opener cavity to a collection channel and/or receptacle.

The capsule packaging and parts thereof on the one hand, and the capsule ingredient(s) on the other hand, should be evacuated and/or collected separately, and kept separate, after separation thereof so that they can enter the standard dedicated recycling channels for plastic or metal, such as aluminium, and organic material, such as beverage and food ingredient.

Normally, the machine has a drive mechanism which has a motor or which is connectable to and actuatable by a motor-containing home appliance such as a food processor, a mixer or a drill. Hence, when the machine is for use at home or in a restaurant, for example, the machine may be arranged to be mounted on the rotatable screw or connector of a food processor and does thus not require its own motor. For use in public places, the machine may be fitted with its own motor which may optionally be powered by renewable energy, such as solar energy via solar cells.

The machine may be arranged for separating the capsule packaging from the capsule ingredient(s) in batches or continuously.

Another aspect of the invention relates to a capsule-treatment method for separating a packaging of a capsule, in particular made of metal such as aluminium and/or plastic, from a capsule ingredient contained therein, in a machine therefor, such as a machine as described above. Such method comprises: feeding a capsule packaging containing a capsule ingredient to this machine; opening the fed capsule packaging and removing the capsule ingredient therefrom in this machine; parting the opened capsule packaging from the capsule ingredient; collecting the opened capsule packaging; and collecting the capsule ingredient.

As opposed to prior art industrial separators of capsules and ingredients contained therein, the machine of the invention may be used with dried or non dried capsules. Hence, no drying step is required which saves energy.

BRIEF DESCRIPTION OF THE DRAWINGS

The invention will now be described with reference to the schematic drawings, wherein.

DETAILED DESCRIPTION

Figure 1:
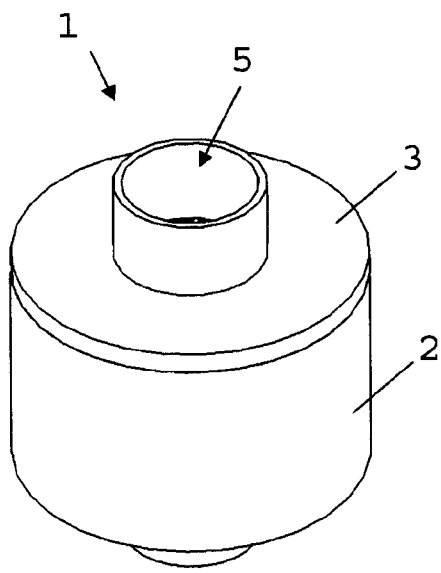
FIGS. 1 to 3 show different perspective schematic views of a first embodiment of a capsule separator according to the invention.
Figure 2:
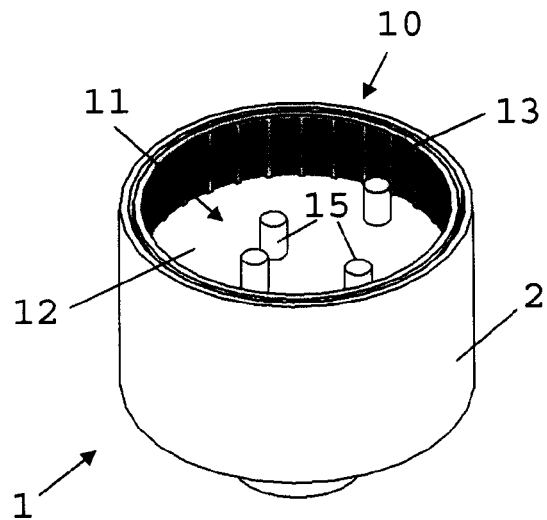
Figure 3:
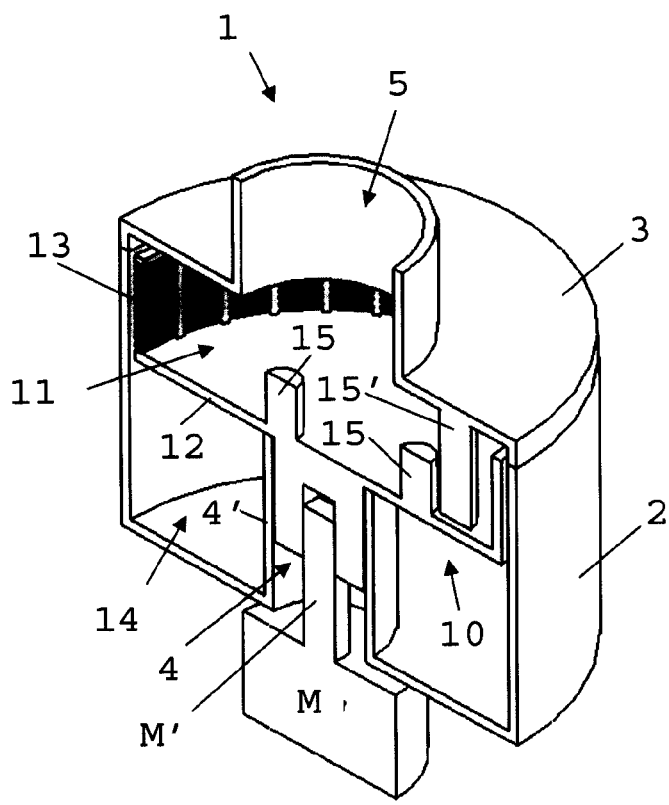

FIGS. 1 to 3 show a first embodiment of a capsule-treatment machine 1 for separating a packaging of a capsule from a capsule food or beverage ingredient contained therein, in accordance with the invention.

Machine 1 has a housing 2 with a lid 3 and a connector arrangement 4 for engaging with an external drive means having a motor M, schematically shown in FIG. 3. Such a motor M can be a food processor motor whose rotatable drive rod M' engages with connector arrangement 4 to drive machine 1. Lid 3 is provided with an inlet 5 for feeding such machine 1 with used capsules (not shown) containing a residual or left over food or beverage ingredient (not shown).

Machine 1 further includes an arrangement 10 for opening the packagings of capsules fed via inlet 5 and for removing the capsule ingredient(s) from the opened capsules. Opening and removal arrangement 10 are arranged to rotate about drive rod M' relatively to the fed capsules and to intercept the capsules for opening the capsule packagings and for removing the ingredient therefrom.

More specifically, opening and removal means 10 have a cavity 11 in which the fed capsule packagings are opened and the capsule ingredients removed therefrom. The opener cavity includes a series of rotatable shock members 15 in the shape of hard rigid rods that extend upright from the upper planar surface of a circular rotatable base 12 driven by motor M and a series of fixed shock members 15', one of which is shown in FIG. 3, secured to lid 3. Moreover, the fixed shock members 15' shown in FIG. 3 is located adjacent to the rotation path of a rotatable shock member 15.

Furthermore, opener cavity 11 is associated with a mesh sieve arranged as a wall 13 extending upwards from a peripheral part of base 12. Mesh wall 13 is arranged to allow the passage of ingredients from the capsule and hold back emptied capsule packagings or torn away parts thereof.

Also shown in FIG. 3, an ingredient collection receptacle 14 is located at the bottom of housing 2 underneath opener cavity 11. Connector arrangement 4 extends via a central passage 4' in housing 2 through collection receptacle 14 to base 12.

Machine 1 is operated as follows: used capsules containing residual food or beverage ingredients are fed to machine 1 via inlet 5 into cavity 11 onto the upper surface of base 12. Motor M is switched on to actuate opening and removal arrangement 10. Consequently, base 12 with rotatable shock members 15 start to rotate within cavity 11 and adjacent to fixed shock members 15'. Such a rotation motion drives the capsules on base 12 against hard and rigid shock members 15,15', against wall 13 and against each other, with an energy that increases with the rotational speed of base 12.

When the speed of the system is sufficient, the packagings of the capsules are broken open, smashed or torn open by the effect of hitting the capsules violently against and/or by shock members 15,15'.

By continuing to subject the opened capsule packagings to such a shock and inter-shock treatment, the capsule ingredients contained therein are shaken out or removed from the capsule packagings. The centrifugal force resulting from the rotation of the system on the capsule ingredients freed from their capsule packagings drives the capsule ingredients against mesh wall 13 that is configured to allow the passage of the ingredient therethrough and retaining the capsule packagings and possibly torn away parts thereof. The ingredients that have passed through walls 13 are then collected at the bottom of housing 2 in collection receptacle 14.

Once the separation process is over, the user may collect the emptied open capsule packagings in opener cavity 11 upon removal of lid 3 and the capsule ingredients collected in collection receptacle 14 upon removal of base 12 with mesh wall 13, in view of separate recycling of the capsule ingredient on the one hand and the capsule packaging material on the other hand.

Such a machine 1 allows the separation of batches of capsule packagings and capsule ingredients. One or more capsules may be treated simultaneously for separation of the packaging and the ingredient. The possibility of mounting such a machine on a food processor makes it an advantageous solution for home use.

Figure 4:
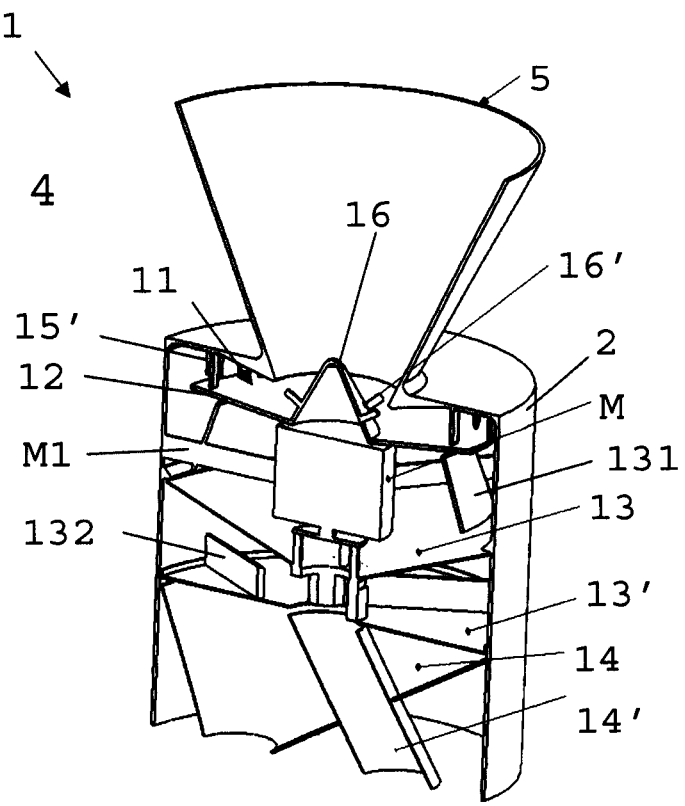
FIGS. 4 to 9 show perspective schematic views of six further embodiments of capsule separators according to the invention.

FIG. 4, in which the same references designate generally the same elements, shows another embodiment of a machine 1 according to the invention.

Rotatable base 12 is located below a conical inlet 5 and is driven by a motor M that is supported in housing 2 by three support members M1 in the form of rods, two of which are shown in FIG. 4. Base 12 has a centrally located rotary beater having a cone 16 rotating with base 12 and a series of members 16' protruding outwards from cone 16. Housing 2 has a series of fixed shock member in the form of vertical fingers 15' arranged around a peripheral part of base 12. Fingers 15' are spaced apart from one another by a distance which is sufficiently small to prevent the passage of capsule packagings that have not yet been torn open.

Underneath rotatable base 12, machine 1 includes a first conical mesh sieve 13 and a second planar mesh sieve 13' located under mesh sieve 13 for parting capsule packaging material from the capsule ingredient(s). Conical guide members or panels 131 are arranged above a peripheral part of sieve 13 to guide down-coming capsule packaging material and ingredient material from cavity 11 over the edge of base 12 to this peripheral part so as to maximise the working surface of sieve 13 in view of the down-coming material.

Upper sieve 13 is a coarse sieve for separating capsule packagings and larger parts thereof. Lower sieve 13' is a fine sieve for separating smaller capsule packaging parts, such as fine aluminium lids when present, from the capsule ingredient.

Lower mesh sieve 13' is arranged above a funnel-shaped passage 14 for collecting and evacuating capsule ingredient material passing through mesh sieves 13'. Furthermore, both mesh sieves 13,13' have a central opening located above a lower tubular passage 14' for collecting and evacuating capsule packaging material. Lower mesh sieve 13' cooperates with a rotatable scraper 132, driven by motor M, for promoting passage of the capsule ingredient through sieve 13' and for guiding capsule packaging material to the central opening of sieve 13' for collection in passage 14'.

During operation, capsules containing a used ingredient are fed via inlet 5 into opener cavity 11 down onto rotating base 12 and beater 16,16' by which they are violently thrown against spaced apart fingers 15' where they are torn open and smashed until the capsule ingredient is freed from the capsule packagings and until the capsule packagings are broken into such small pieces that they can pass between fingers 15'. The capsule ingredient and capsule packaging material are driven through the spaced apart fingers 15' by the rotary motion of base 12 over the edge thereof down along guide panels 131 between support members M1 onto conical sieve 13. Large capsule packaging parts are guided along conical sieve 13 into packaging collection and evacuation passage 14'. The capsule ingredient and small capsule packaging parts pass through upper sieve 13 onto lower sieve 13'. Scraper 132 is driven by motor M to rotate over sieve 13' so as to promote the passage of ingredients through sieve 13' and guide capsule packaging parts into the capsule collection and evacuation passage 14'. The ingredient passing through sieve 13' is then collected and evacuated via passage 14.

Passage 14 may guide the capsule ingredient into a dedicated ingredient receptacle (not shown), for instance an accumulation bag or container. The same applies to passage 14' that may lead to a dedicated capsule packaging receptacle (not shown). This allows separate collection of the capsule packaging material and capsule ingredient suitable for the usual recycling channels.

Figure 5:
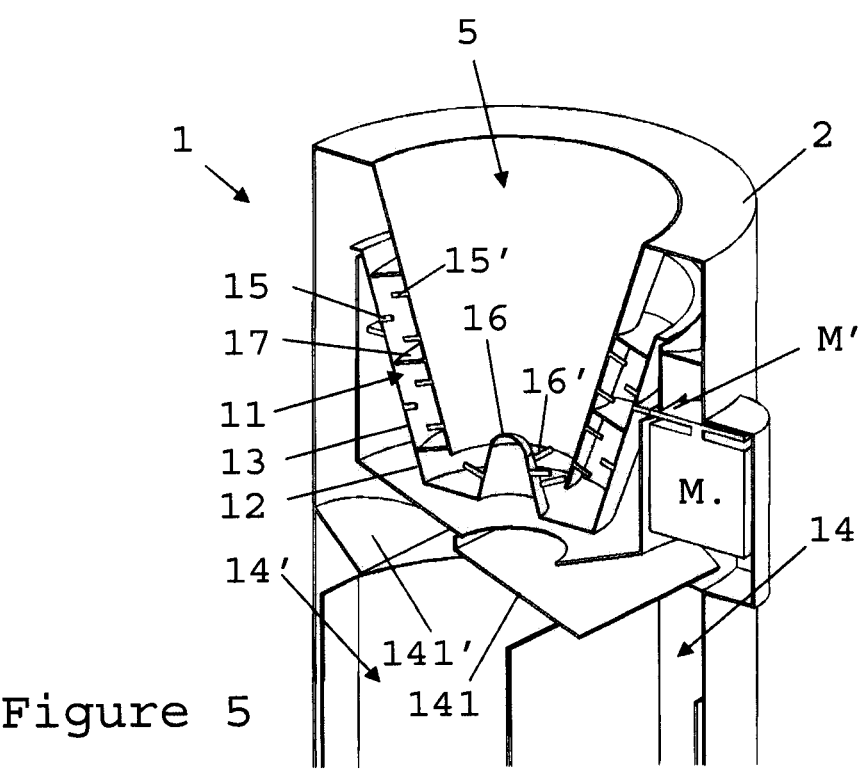

FIG. 5, in which the same numeric references designate generally the same elements, illustrates a further embodiment of the invention in which the capsules are opened along an ascending ramp.

Rotatable base 12 has a frusto conical shape and is located below a correspondingly shaped conical inlet 5. Base 12 is driven via a gear arrangement M' by a side motor M that is supported in housing 2. Base 12 comprises a centrally located rotary beater having a cone 16 rotating with base 12 and a series of members 16' protruding outwards from cone 16. Opener cavity 11 has a series of fixed shock member 15' protruding inside from conical inlet 5 and a series of rotatable shock members 15 that protrude from base 12. Furthermore, base 12 incorporates a sieve 13 allowing the passage of the capsule ingredient and retaining the capsule packagings and parts thereof.

A ramp arrangement 141 located underneath sieve 13 is configured to guide the capsule ingredient passing through sieve 13 to collection and evacuation passage 14.

A fixed spiral capsule ramp 17 extends from a bottom part of base 12 upwards between base 12 and conical inlet 5. Ramp 17 is secured to conical inlet 5 and has a series of through-passages (not shown) along its outer edge for allowing the passage of rotatable shock members 15. In a variation, the spiral capsule ramp may be secured to base 12 and rotatable therewith, the rotatable ramp having through-passages along its inner edge for allowing the passage of the fixed shock members.

A further ramp arrangement 141' located underneath an upper edge of conical base 12 is provided to guide capsule packagings and parts thereof to collection and evacuation passage 141'.

During operation, capsule packagings containing a used ingredient are fed via inlet 5 into opener cavity 11 down onto rotating base 12 and beater 16,16' by which they are impelled onto ramp 17. The capsule packagings are driven up the ramp by rotating shock members 15 and opened by crushing between the fixed and rotating shock members 15,15'. The capsule ingredient that is thereby freed is evacuated through sieve 13 onto ramp arrangement 141. Opened capsule packagings and parts thereof, free of capsule ingredients, are driven up ramp 17 over the upper edge of base 12 and onto guide ramp 141' into collection and evacuation passage 141'.

Passage 14 may then guide the capsule ingredient into a dedicated ingredient receptacle (not shown) and passage 14' can guide the capsule packagings and parts thereof to a dedicated capsule packaging receptacle (not shown).

Figure 6:
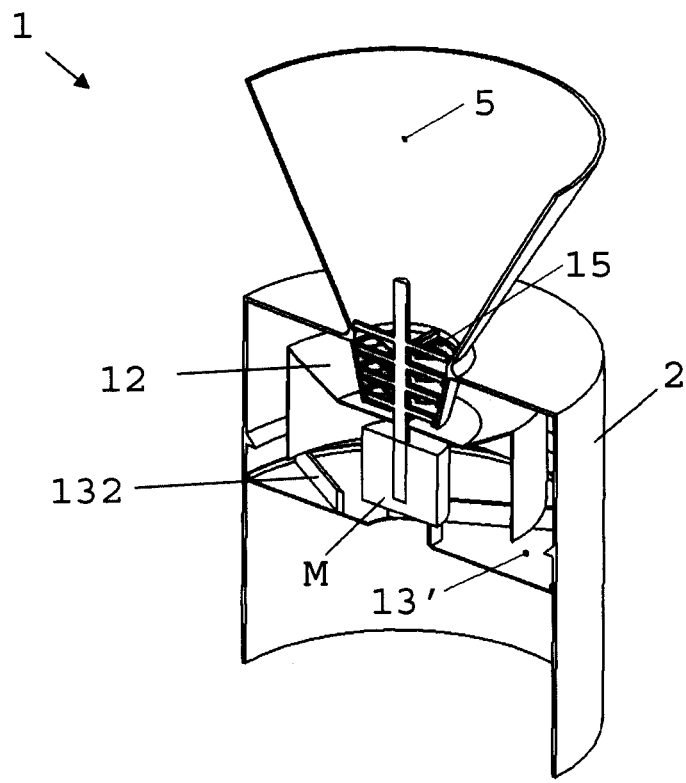

FIG. 6, in which the same numeric references designate generally the same elements, shows another embodiment of a machine 1 according to the invention, in which the capsule packagings are opened by a rotary beater 15.

As shown in FIG. 6, the bottom end of conical capsule inlet 5 leads to a capsule opener 15 located in an opener cavity extending at the bottom end of conical inlet 5. Capsule opener 15 is rotatably driven in this opener cavity by motor M. Capsule opener 15 has an upright shaft which is connected to motor M and a series of radial members, in particular cutting blades, that are rotationally drivable by the shaft.

A rotatable base 12 is arranged underneath the rotatable radial members of capsule opener 15. Sieve 13' and scraper arrangement 132 as well as the capsule evacuation and collection arrangement (not shown) and the ingredient evacuation and collection arrangement (not shown) correspond to the ones shown in FIG. 4 and work generally similarly.

When used capsules are supplied to inlet 5, they are fed to an upper part of rotating capsule opener and are passed through the rotating radial members whereby the capsule packagings are ground or crushed. A mixture of capsule packaging parts and capsule ingredient falls from the bottom of the rotating radial members onto the rotating base 12 and is propelled, by centrifugal force, against inner walls of housing 2. From these housing walls, the mixture falls down onto the parting sieve 13' where the capsule packaging material and the ingredient are parted and separately evacuated and collected as explained above in relation with FIG. 4.

Figure 7:
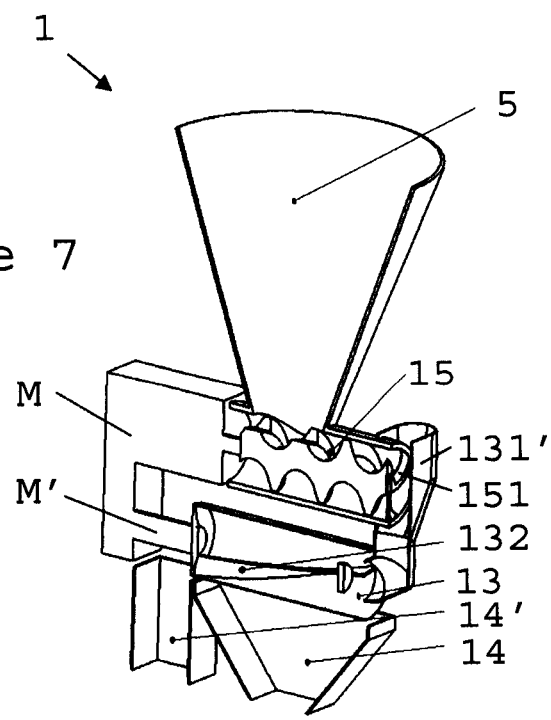

FIG. 7, in which the same numeric references generally designate the same elements, shows a yet further embodiment of the invention with a mincer or chopper arrangement.

In this embodiment, capsules with a used ingredient are supplied via a conical inlet 5 onto an Archimedes's screw 15 and are driven by screw 15 to its end at which they are minced or chopped by rotating cutting blade 151. A mixture of minced or chopped capsule packaging material and ingredients is guided via a channel 131' into an end of a tubular sieve 13 that is rotatably driven by drive shaft M' of motor M. A pair of generally helical elongated blade mixers 132, one of which is shown in FIG. 7, space sieve 13 apart from drive shaft M' of motor M. Blade mixers 132 promote, on the one hand, the passage of the ingredients through sieve 13 into ingredient collection and evacuation channel 14 and, on the other hand, guide the capsule packaging material along tubular sieve 13 to its opposite end and over the edge of sieve 13, between sieve 13 and drive shaft M', into an evacuation channel 14' for capsule packaging material.

Like in the previous embodiments, passage 14 may then guide the ingredient into a dedicated ingredient receptacle (not shown) and passage 14' can guide the capsule packaging material to a dedicated capsule packaging receptacle (not shown).

Figure 8:
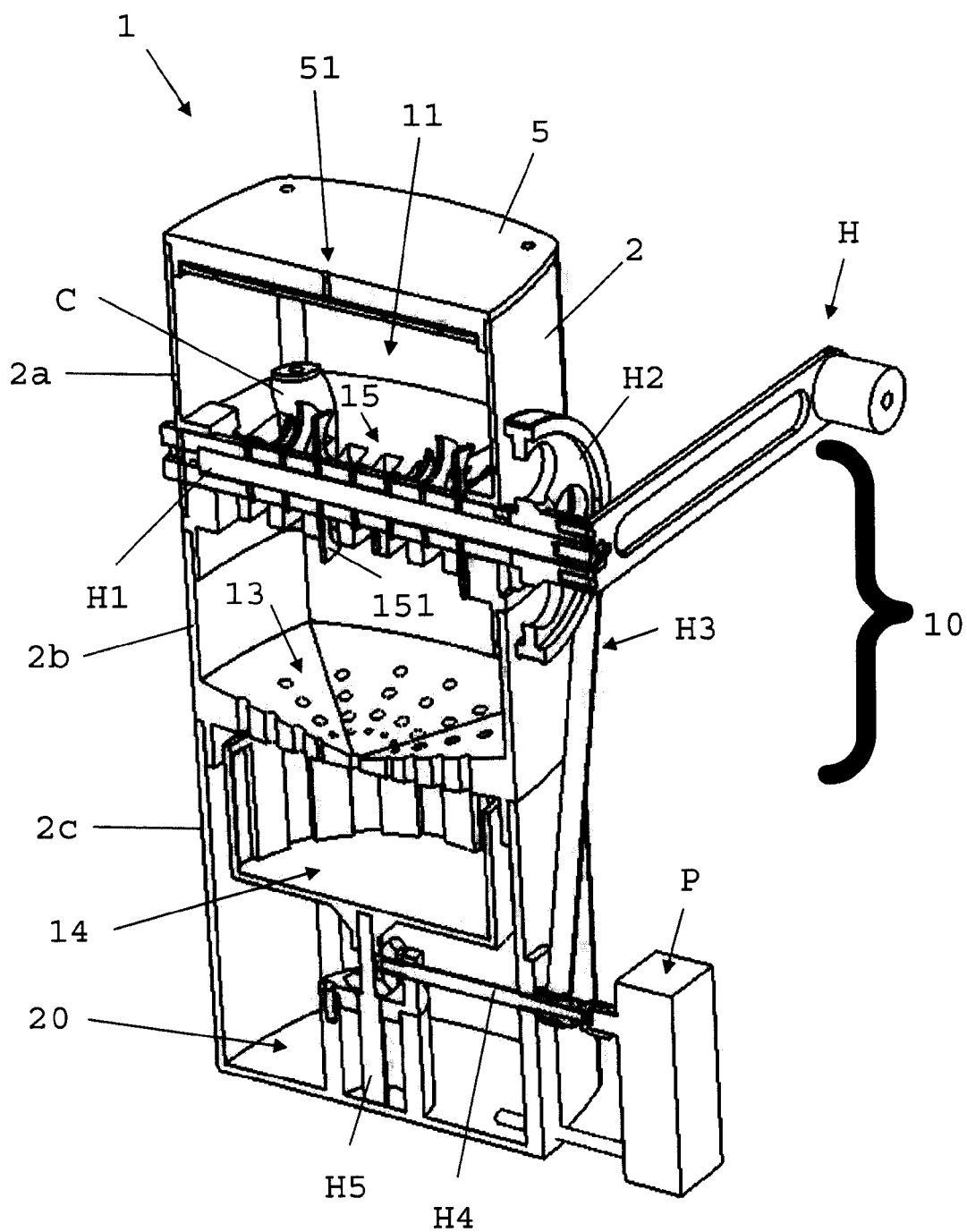

FIG. 8, in which the same numeric references designate generally the same elements, shows another embodiment of a machine 1 according to the invention, which is manually driven.

Machine 1 has a housing 2 covered with a lid 3 removable from housing 2 for allowing the feeding of capsules C into cavity 11. A bottom part of cavity 11 is funnel-shaped to guide fed capsules C onto a shredder 15. This shredder 15 includes a series of cutting blades 151 arranged side-by-side on a shaft H1 that is driven by a user-handle H. A sieve 13 is located underneath shredder 15 and formed by a generally recessed horizontal intermediate foraminate or perforated plate. Sieve 13 has a series of through holes for allowing the passage of capsule ingredients and for retaining capsule packaging parts dropping from a bottom end of shredder 15 during use, upon actuating handle H1.

A capsule ingredient collection receptacle 14 is arranged underneath sieve 13 to collect ingredients evacuated through the sieve's through-openings.

In order to facilitate passage of capsule ingredient via the through-openings of sieve 13, machine 1 includes a water loop circulation system. For this purpose, machine 1 has a pump P that is arranged to pump water, or another liquid, via a pipe or hose (not shown) though an opening 51 in lid 5. Water is then supplied from above into housing 2 and washes the capsule ingredients and capsule packaging material from cavity 11 and shredder 15 down onto sieve 13. The capsule ingredients are then selectively washed through the through-openings of sieve 13 into receptacle 14, leaving the washed shredded capsule packaging parts on sieve 13.

Receptacle 14 is foraminate to allow selective passage of liquid, such as water, therethrough into a collection reservoir 20 located thereunder, but retain capsule ingredients in receptacle 14. Moreover, to promote drainage of water from capsule ingredients through receptacle 14 into reservoir 20, receptacle 14 is mounted in a centrifugal arrangement on vertical rotational drive shaft H5 that is indirectly driven by handle H.

Indeed, as shown in FIG. 8, handle H, on the one hand, drives shaft H1 of shredder 15 and, on the other hand, drives horizontal drive haft H4 via wheel H2 and driving belt H3. Drive shaft H4 is connected via gear wheels to vertical shaft H5. Moreover, drive shaft H4 actuates pump P for pumping water from collection reservoir 20 to cavity 11.

Moreover, housing 2 is made of an assembly of upper section 2*a* with shredder 15, intermediate section 2*b* and bottom section 2*c*. These sections 2*a*, 2*b*, 2*c* can be taken apart by the user for emptying capsule packaging parts from section 2*b* and capsule ingredients from receptacle 14 located in section 2*c* and for cleaning and/or servicing machine 1.

In a variation of the machine shown in FIG. 8, the handle may be replaced with a motor, like in the previous embodiments. Likewise, the machines shown in FIGS. 1 to 7, as well as the one shown in FIG. 9 and discussed hereafter, may be modified so that they are hand-driven.

Figure 9:
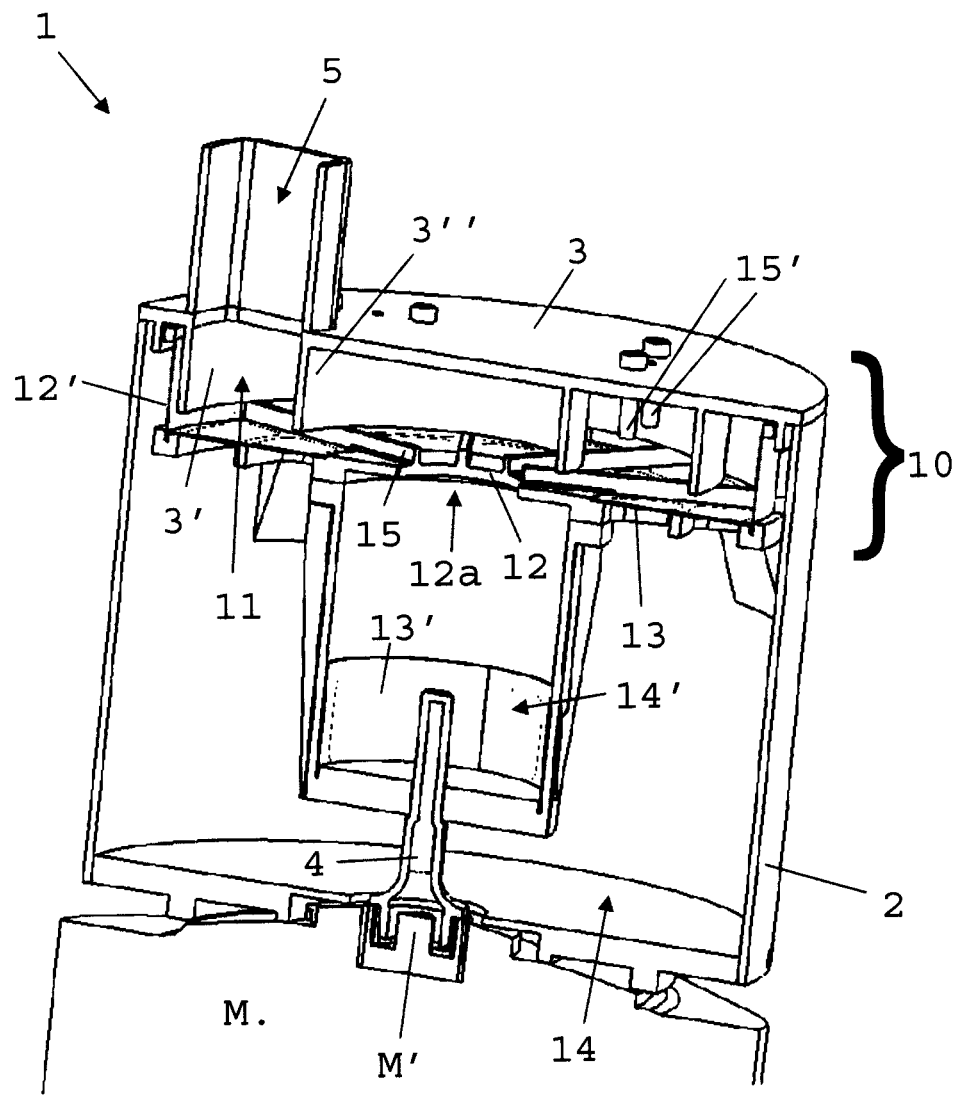

FIG. 9, in which the same numeric references designate generally the same elements, shows another embodiment of a machine 1 according to the invention.

Rotatable base 12 has a horizontal sieve 13 with an upright peripheral wall 12' that encloses a spiral capsule path way which is delimited by spiral uprights walls 3',3" extending downwards from lid 3. Fixed spiral walls 3,3" together with lid 3 and rotatable base 12 delimit opener cavity 11 that has a corresponding spiral shape extending from underneath inlet 5 to a central through-opening 12*a* of rotatable base 12.

During use, capsules are fed via inlet 5 into cavity 11 and driven on base 12 from a peripheral part to its central through-opening 12*a* along spiral cavity 11. Rotatable base has a series of rotatable radial shock members 15 that drive the capsules along cavity 11. Furthermore, members 15 cooperate with fixed shock members 15' extending downwards from lid 2 so as to open the capsules' packagings by shock between members 15,15'. The capsule ingredient that is thereby freed is selectively evacuated through sieve 13 into ingredient collector receptacle 14. The remaining capsule packagings are guided along cavity 11 to the middle or rotatable base 12 and evacuated via the central through-opening 12*a* into the capsule packaging collection receptacle 14' that is assembled to base 12 and extends therebelow under the central through-opening 12*a*.

Receptacle 14' rotates with base 12 on connector 4 that is driven by motor M via its rotatable drive rod M'. Moreover Receptacle 13' has a peripheral wall whose bottom part is made of a sieve 13' for evacuating by centrifugal force any remaining capsule ingredient to capsule ingredient receptacle 14.

Once the separation process of the capsule packagings and the capsule ingredient is over, the user may collect the emptied open capsule packagings in receptacle 14' upon removal of lid 3 and receptacle 14' with base 12, and then the capsule ingredients collected in receptacle 14 on the bottom of housing 2, for allowing separate recycling of the capsule ingredient on the one hand and the capsule packaging material on the other hand.

Such a machine 1 is suitable for the separation of batches of capsule packagings and capsule ingredients. One or more capsules may be treated simultaneously for separation of the packaging and the ingredient. The possibility of mounting such a machine on a food processor makes it an advantageous solution for use at home.

What is claimed is:

1. A capsule-treatment machine for separating a packaging of a capsule made a recyclable material of aluminum or plastic from a spent or used capsule food or beverage ingredient contained therein, comprising:

means for opening the packaging of the capsule fed to the machine and for removing the capsule ingredient from the opened capsule packaging, with the opening and removal means being arranged to intercept and rotate relatively to the fed capsule packaging to provide impact to the capsule packaging with a force sufficient to break open, smash or tear open the packaging of the capsule to remove the spent or used capsule ingredient therefrom and to separate it from the capsule packaging;

means for parting the opened capsule packaging from the capsule ingredient;

means for collecting the opened capsule packaging; and means for collecting the capsule ingredient.

2. The machine of claim 1, wherein the opening and removal means include sharp or cutting edges for opening the capsule packaging.

3. The machine of claim 2, wherein the opening and removable means comprises a mincer, shredder or chopper optionally cooperating with an Archimedean screw for driving the capsule onto the mincer, shredder or chopper.

4. The machine of claim 1, wherein the opening and removal means comprises a rotatable drive shaft from which one or more members extend radially, the capsule being feedable through the rotating radial members.

5. The machine of claim 4 wherein the rotatable shaft is an upright shaft, and the members are shock members or cutting members.

6. The machine of claim 1, wherein the parting means comprises at least one sieve for allowing the passage of the capsule ingredient and for preventing the passage of the capsule packaging or parts thereof.

7. The machine of claim 6 wherein the sieve is a mesh sieve or a sieve made of a foraminate plate-like member, and the sieve optionally cooperates with at least one of a stirring arrangement, a scraping arrangement and a liquid washing arrangement for promoting the passage of the capsule ingredient through the sieve or for moving capsule ingredient and the capsule packaging and/or parts thereof along the sieve.

8. The machine of claim 1, wherein the opening and removal means is located in an opener cavity which further forms the collection means for collecting the capsule packaging or the capsule ingredient.

9. The machine of claim 1, wherein the opening and removal means is located in an opener cavity, at least one of the capsule packaging and the capsule ingredient being evacuated from the opener cavity to a collection channel or receptacle.

10. The machine of claim 1, further comprising a drive mechanism which has a motor or which is connectable to and actuatable by a motor-containing home appliance.

11. The machine of claim 10 wherein the home appliance is a food processor, a mixer or a drill.

12. A capsule-treatment machine for separating a packaging of a capsule made a recyclable material of aluminum or plastic from a spent or used capsule food or beverage ingredient contained therein, comprising:

means for opening the packaging of the capsule fed to the machine and for removing the spent or used capsule ingredient from the opened capsule packaging, with the opening and removal means being arranged to intercept and rotate relatively to the fed capsule packaging, wherein the opening and removal means comprises an opener cavity that receives the fed capsule and that contains one or more shock members that are movable relative to the fed capsule and that are arranged to impact the capsule packaging with a force sufficient to break open, smash or tear open the capsule packaging and remove the capsule ingredient therefrom and to separate it from the capsule packaging;

means for parting the opened capsule packaging from the capsule ingredient, the parting means comprising at least one sieve for allowing the passage of the capsule ingredient and for preventing the passage of the capsule packaging or parts thereof;

means for collecting the opened capsule packaging; and means for collecting the capsule ingredient.

13. The machine of claim 12, wherein the shock members are rotatably movable to impact the capsule packaging.

14. The machine of claim 12, wherein the opening and removal means comprise a rotatable drive means arranged to rotate and drive the shock members or the fed capsule.

15. The machine of claim 14, wherein the rotatable drive means comprises a rotatable surface, the shock members comprising at least one shock member that is drivable by the surface or at least one shock member that is fixed in the opener cavity.

16. The machine of claim 15, wherein the rotatable surface is a generally planar surface from which one or more rotatable shock members extend, and the opener cavity comprises one or more fixed shock members, at least one of which is optionally located adjacent to the rotation path of a rotatable shock member.

17. The machine of claim 15, wherein the opener cavity comprises a series of spaced apart shock members at the periphery of the rotatable surface which is arranged to drive the capsule towards the shock members.

18. The machine of claim 17, wherein the spaced apart shock members are fixed in position and the rotatable drive means comprises a rotary beater arrangement centrally located on the rotatable surface for hitting and impelling the fed capsule against the peripheral shock members.

19. The machine of claim 15, wherein the rotatable surface has a conical portion and faces a correspondingly fixed conical surface spaced apart therefrom by a spiral capsule ramp extending therebetween, the capsule being driven up the ramp by rotatable shock members and the capsule packaging opened against fixed shock members.

20. A method for separating a packaging of a capsule made a recyclable material of aluminum or plastic from a capsule food or beverage ingredient contained therein for recycling thereof in a machine as defined in claim 16, the method comprising:

feeding a capsule comprising a capsule packaging containing a spent or used capsule ingredient into the machine to provide impact to the capsule packaging with a force sufficient to break open, smash or tear open the packaging of the capsule to remove the spent or used capsule ingredient therefrom and to separate it from the capsule packaging;

opening the fed capsule packaging and removing the capsule ingredient therefrom in the machine;

parting the opened capsule packaging from the capsule ingredient;

collecting the opened capsule packaging for recycling; and collecting the spent or used capsule ingredients for disposal.

* * * * *

UNITED STATES PATENT AND TRADEMARK OFFICE
CERTIFICATE OF CORRECTION

PATENT NO.       : 8,549,824 B2
APPLICATION NO. : 12/996760
DATED            : October 8, 2013
INVENTOR(S)      : Boussemart et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 416 days.

Signed and Sealed this

Fifteenth Day of September, 2015

Michelle K. Lee
*Director of the United States Patent and Trademark Office*